(12) United States Patent
Sherlock

(10) Patent No.: US 10,394,635 B2
(45) Date of Patent: Aug. 27, 2019

(54) CPU WITH EXTERNAL FAULT RESPONSE HANDLING

(71) Applicant: HEWLETT PACKARD ENTERPRISE DEVELOPMENT LP, Houston, TX (US)

(72) Inventor: Derek Alan Sherlock, Boulder, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 284 days.

(21) Appl. No.: 15/324,945

(22) PCT Filed: Oct. 29, 2014

(86) PCT No.: PCT/US2014/062806
§ 371 (c)(1),
(2) Date: Jan. 9, 2017

(87) PCT Pub. No.: WO2016/068897
PCT Pub. Date: May 6, 2016

(65) Prior Publication Data
US 2017/0206126 A1    Jul. 20, 2017

(51) Int. Cl.
| | | |
|---|---|---|
| G06F 11/00 | (2006.01) | |
| G06F 11/07 | (2006.01) | |
| G06F 13/40 | (2006.01) | |
| G06F 12/06 | (2006.01) | |
| G06F 12/1009 | (2016.01) | |

(52) U.S. Cl.
CPC ........ *G06F 11/0757* (2013.01); *G06F 11/073* (2013.01); *G06F 11/0721* (2013.01); *G06F 11/0793* (2013.01); *G06F 12/0623* (2013.01); *G06F 12/0692* (2013.01); *G06F 12/1009* (2013.01); *G06F 13/40* (2013.01); *G06F 2212/65* (2013.01); *G06F 2212/684* (2013.01); *G06F 2212/7201* (2013.01)

(58) Field of Classification Search
CPC ............ G06F 11/0757; G06F 11/0721; G06F 11/073; G06F 11/0793
See application file for complete search history.

(56) References Cited

U.S. PATENT DOCUMENTS

| | | | |
|---|---|---|---|
| 4,939,636 A | 7/1990 | Nakagawa et al. | |
| 5,212,776 A | 5/1993 | Zandveld et al. | |
| 5,666,537 A * | 9/1997 | Debnath | G06F 1/3203 |
| | | | 713/322 |
| 7,849,310 B2 | 12/2010 | Watt et al. | |
| 8,255,602 B2 | 8/2012 | Kimelman | |
| (Continued) | | | |

OTHER PUBLICATIONS

PCT International Search Report and Written Opinion; PCT/US2014/062806; dated Jun. 16, 2015; 11 pages.

*Primary Examiner* — Bryce P Bonzo
*Assistant Examiner* — Katherine Lin
(74) *Attorney, Agent, or Firm* — Tarolli, Sundheim, Covell & Tummino L.L.P.

(57) ABSTRACT

A system includes a central processing unit (CPU) to process data. A first memory management unit (MMU) in the CPU generates an external request to a bus for data located external to the CPU. An external fault handler in the CPU processes a fault response received via the bus. The fault response is generated externally to the CPU and relates to a fault being detected with respect to the external request.

11 Claims, 5 Drawing Sheets

(56) References Cited

U.S. PATENT DOCUMENTS

| | | |
|---|---|---|
| 2005/0172169 A1 | 8/2005 | Sekiguchi et al. |
| 2007/0055843 A1 | 3/2007 | Lameter |
| 2013/0185542 A1 | 7/2013 | Mejdrich |
| 2014/0281263 A1* | 9/2014 | Deming .................. G06F 12/08 |
| | | 711/135 |
| 2014/0281299 A1 | 9/2014 | Duluk, Jr. et al. |
| 2015/0199279 A1* | 7/2015 | Haugan ............... G06F 12/1009 |
| | | 711/133 |
| 2015/0199280 A1* | 7/2015 | Molnar ............... G06F 12/1027 |
| | | 711/207 |

* cited by examiner

_US 10,394,635 B2_

CPU WITH EXTERNAL FAULT RESPONSE HANDLING

BACKGROUND

Today's central processing unit (CPU) architectures often implement a single tier of memory management implemented in a memory management unit (MMU) of the CPU. The MMU can be part of the CPU. The MMU utilizes a translation cache often referred to as a translation lookaside buffer (TLB), backed by storage referred to as a page table (PT), and a hardware or software device for populating the TLB on demand from the PT. The MMU can also include logic to check access permissions, test fault conditions, and if necessary generate a synchronous page fault, which results in the execution by the CPU of a handler routine referred to as a page fault handler (PFH).

DETAILED DESCRIPTION

This disclosure provides a central processing unit (CPU) that receives an external fault response relating to an external request (e.g., read or write) from the CPU to a supervisory entity, such as a supervisory memory management unit (MMU). The supervisory MMU can control permissions to a common memory storage area and thus allow multiple CPUs to access the memory in a secure manner (e.g., not allowing a non-trusted CPU to access data of another CPU). For example, the supervisory MMU can determine which areas of the common memory storage area can be accessed by any given CPU based on permissions stored in a page table. If an access to a common memory area is requested that a given CPU does not have requisite permission to access, for example, or if the common memory area has been swapped out to another memory tier at the time of the access, an external fault can be generated that can initiate further fault processing by the supervisory MMU and the CPU that generated the request.

In one example, a system is provided that includes the CPU to process data. A first memory management unit (MMU) (or MMUs) in the CPU generates an external request (e.g., read or write request) to a bus for data located at an address external to the CPU. An external fault handler in the CPU processes a fault response received at the CPU (e.g., via a bus). The fault response is generated externally to the CPU (e.g., by a supervisory MMU or watchdog timer) and relates to a fault being detected with respect to the external address of a read or write request from the CPU. The supervisory MMU can manage storage mapping.

Figure 1:
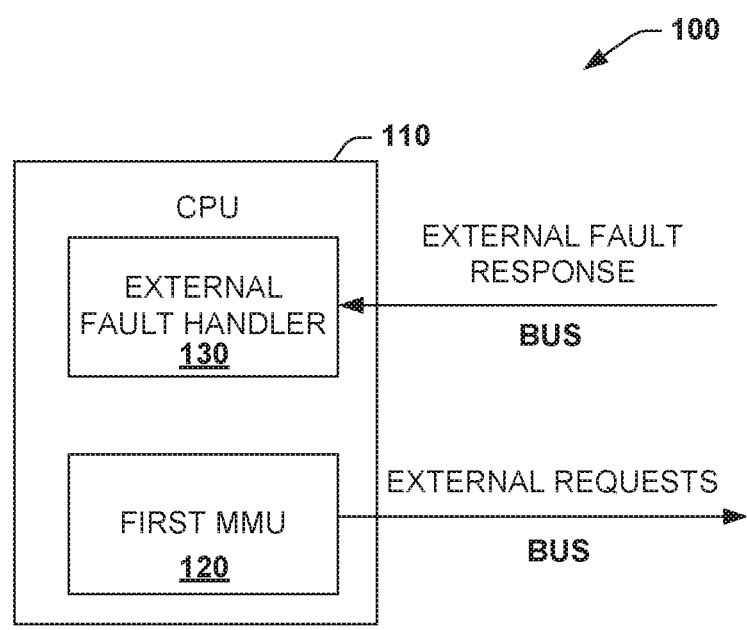
FIG. 1 illustrates an example of a central processing unit (CPU) that receives an external fault response related to a read or write request sent out from the CPU.

FIG. 1 illustrates an example of a system 100 that includes a central processing unit (CPU) 110 that receives an external fault response related to an external address of a read or write request from the CPU. The CPU 110 includes a first memory management unit (MMU) 120 to generate an external address for a read or write request to a bus for data located external to the CPU. Although the first MMU 120 is described in the singular, other example CPUs can employ multiple MMUs. An external fault handler 130 in the CPU processes a fault response received at an input of the CPU. The fault response is generated externally to the CPU 110 (e.g., by supervisory MMU, supervisory fault handler or watchdog timer) and corresponds to a fault being detected with respect to the external request. The first MMU 120 (e.g., a first tier MMU) performs an initial address translation from the CPUs virtual address space to a physical address space relating to a common storage area (See e.g., FIGS. 3 and 4). Rather than a direct physical mapping to the common storage area via the generated physical address, a supervisory MMU (not shown, See e.g., FIG. 4) performs another address translation (e.g., second tier translation) by translating the physical address to a storage address of the common storage area. Such second-tier translation obviates the need for the CPU 110 to perform its own translation to the common memory storage area while also protecting its data from other less trusted entities that also access the common memory storage area.

The supervisory MMU (or other entity) can control permissions to the common storage area and thus allow multiple CPUs to access the memory in a secure manner (e.g., not allowing a non-trusted CPU to access data of another CPU). For example, the supervisory MMU can determine which areas of the common memory storage area can be accessed by any given CPU based on permissions stored in a page table. If an access to a common memory area is requested that a given CPU does not have requisite permission to access, for example, the external fault response can be generated that can initiate further fault processing by the supervisory MMU and the CPU that generated the faulted read or write. In another fault example, if a common memory area has been swapped out to another memory tier at the time of the access by the supervisory MMU, then the external fault response can be generated.

External logic (See e.g., fault response generator FIG. 2) can send the external fault response to the CPU 110 based on an outstanding read request, for example. The external fault response terminates the outstanding read request (or other type of request such as write) without completing it, while informing the CPU 110 that the external fault handler 120 should be executed before the same request can be re-issued. Additional behavior of the CPU 110 in response to receipt of the external fault response can also be provided. This can include suspension or retirement of threads in the CPU 110 which caused the fault, where after processing by the external fault handler 120, the original read that caused the initial fault can be re-issued, for example.

The execution of the external fault handler 120 can employ the same core and thread that was used for the code that resulted in the cache miss that in turn resulted in the read or other type request. This can ensure that a processing core and thread operated by the CPU 110 are available for this purpose. The faulted operation by the CPU 110 ceases to occupy protocol layer tracking resources when the external fault has been reported and the external fault handler 120 is being executed. This ensures that deadlock does not result from accumulated faulted reads (or other type requests) starving fault handlers of available tracking resources. Fault handling by the external fault handler 120 should not block the ability of the thread of execution where the fault occurred to perform context switches (e.g., switch current CPU operations to another processing thread while external fault is processed).

Figure 2:
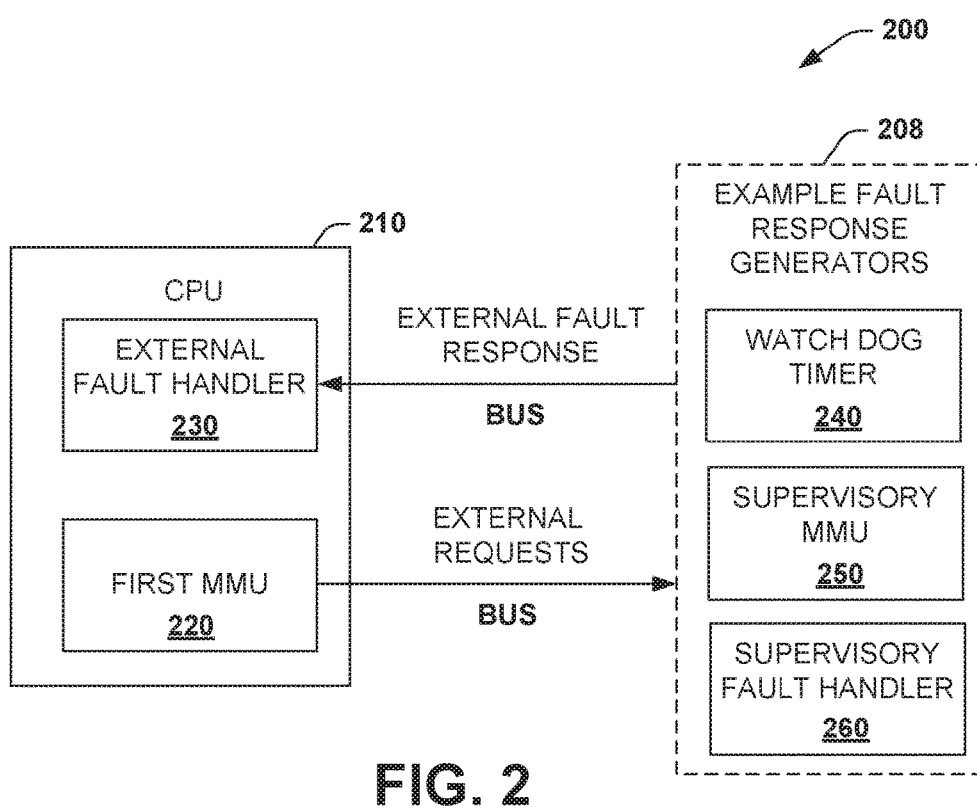
FIG. 2 illustrates an example of a CPU that receives an external fault response from a fault response generator.

FIG. 2 illustrates an example of a central processing unit (CPU) 210 that receives an external fault response from a fault response generator 208. The CPU 210 includes first memory management unit (MMU) 220 to generate an external request to a bus for data located external to the CPU. An external fault handler 230 in the CPU 210 processes a fault response received on the bus of the CPU. For example, the fault response is generated externally to the CPU and relates to a fault being detected with respect to the external address of the read or write request. In this example, the external fault response generator 208 includes logic circuits and/or software adapted to generate the external fault response to the CPU 210.

In one example, the fault response generator 208 can include a watch dog timer 240 to generate the external fault response. The watch dog timer 240 can be employed to monitor bus activities. If no response is determined to have been generated to a given external request (e.g., read or write request) of the CPU 210 and MMU 230, for example, the watch dog timer 240 can time out (e.g., after a predetermined time), generate the external fault response and the external fault handler 230 can then free resources on the CPU (e.g., threads or code paths that generated the fault). In another example, the fault response generator 208 can include a supervisory MMU 250, such as is disclosed with respect to FIGS. 3 and 4. Additionally or alternatively, the fault response generator 208 can include a supervisory fault handler 260, such as disclosed with respect to FIG. 4.

Figure 3:
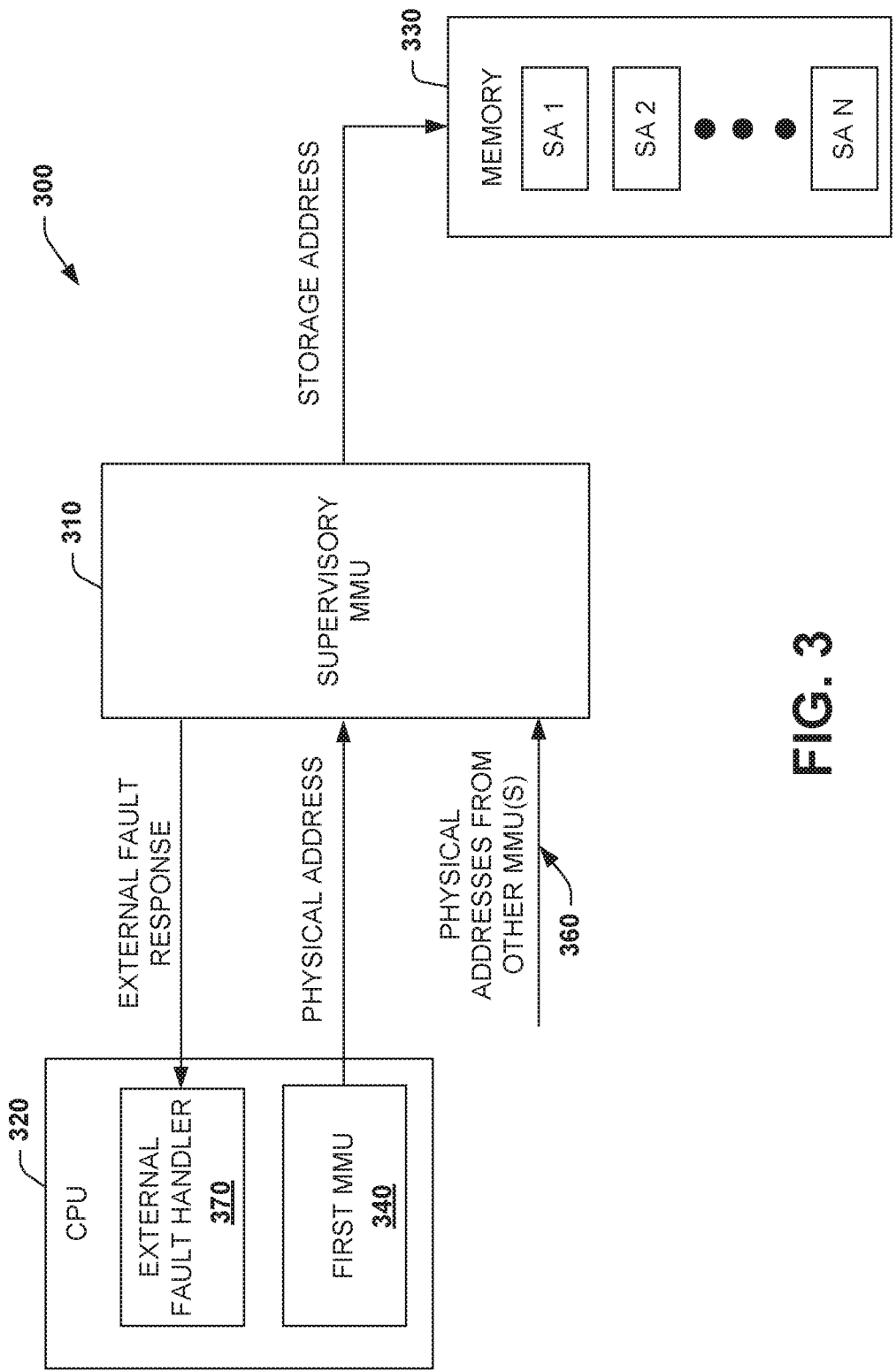
FIG. 3 illustrates an example of a system that employs a supervisory memory management unit to generate an external fault response and control access to a common memory storage area utilized by multiple processing units.

FIG. 3 illustrates an example of a system 300 that employs a supervisory memory management unit (MMU) 310 to control access to a common memory storage area utilized by multiple processing units. The system 300 includes a central processing unit (CPU) 320 to process data with respect to a virtual address generated by the CPU. As used herein, the term "virtual address" refers to one or more internal addresses used within the CPU 320 that are employed to operate processes and threads, and are abstracted from physical addresses by the address translations performed in the CPUs first-tier MMU. Although not shown (See e.g., FIG. 4), the CPU 320 can include one or more processing cores to perform processing of programs and data. Thus, as used herein, the term CPU can include a single core or can include multiple cores where each core is given similar or dissimilar permissions by the supervisory MMU 310 to access a memory 330. In some examples, the supervisory MMU 310 can be a single shared MMU to serve more than one (e.g., all of) the cores in a multi-core CPU. The CPU 320 can also be bundled with other CPUs to perform a server and/or client function, for example. Multiple servers and/or clients can be employed to access the memory 330 via the supervisory MMU (or MMU's) 310. Thus, the supervisory MMU 310 can control and facilitate access to the memory 330 with respect to a single CPU core, multiple CPU cores, multiple CPU chips or modules, multiple servers, and/or multiple clients, for example. For purposes of brevity with respect to FIG. 3, a single CPU 310 is illustrated. Multiple core and multiple CPU examples are disclosed herein with respect to FIG. 4.

The CPU 320 includes a first memory management unit (MMU) 340 to translate the virtual address generated by the CPU cores to a physical address of the memory 330 with respect to the data requested by the CPU. In examples of some types of existing systems, the physical address would be directly applied as a request (e.g., read or write) to an address of the memory 330 for storage and retrieval of data. In the system 300 however, the supervisory MMU 310 translates the physical address of the first MMU 340 to a storage address for storage and retrieval of the data in the memory 330. The storage addresses are shown as SA 1, SA 2, through SA N in the memory 330, where N is a positive integer denoting the number of storage addresses. Each of the storage addresses SA 1 through SA N can also represent a block of memory addresses, such as can be referred to as a page. The memory 330 can be a non-volatile storage in one example, a volatile storage in another example, or a combination of volatile and non-volatile storage. The supervisory MMU 310 controls and manages access to the memory 330 via the storage address associated with the first MMU 340.

In one example function of the supervisory MMU 310, the supervisory MMU controls access to the memory 330. The same MMU 310 can be shared by multiple cores in the CPU 320 for managing access to memory 330. The memory 330 can be a common memory storage area that can be accessed by multiple processing entities, such as via read or write requests from the CPU 320 and read or write requests from other CPUs at 360. As noted previously, each processing entity can include a CPU having one or more cores to perform processing with respect to data in the common memory storage area 330. The respective CPUs can include a first MMU (e.g., a first tier MMU or multiple MMUs) to perform an initial address translation from the CPUs virtual memory to a physical address.

Rather than a direct physical mapping to the common storage area via the generated physical address, the supervisory MMU 310 performs a second address translation (e.g., a second tier translation) by translating the physical address to a storage address of the memory 330. Such second-tier translation obviates the need for the CPU 320 to perform its own translation to the memory 330 while automatically protecting its data from other less trusted entities that also access the common memory storage area.

The supervisory MMU 310 can determine which areas of the common memory storage area 330 can be accessed by any given CPU (e.g., determined by the storage page table that defines permissions for each CPU). In one example, the CPU 320 may be given permission over a subset of the memory blocks (e.g., designated by SA 1 and SA 2) but denied access to other blocks which can be granted to other CPUs. If a common memory area in the memory 330 is requested that a given CPU does not have requisite permission to access, for example, an external fault response can be generated (See e.g., FIG. 4). The external fault can initiate further fault processing by the supervisory MMU 310 and the CPU 320 that generated the fault. Permissions could also be specified separately for different types of memory access requests for each of a plurality of CPUs. For example, a given CPU could have different permissions for reads versus writes versus instruction fetches, while another CPU could have the same or different permissions. The permissions for each of the CPUs could be programmed in a table or other data structure in a supervisory entity such as MMU 310.

The CPU 320 includes an external fault handler 370 to process the external fault response from the supervisory MMU 310. An example fault processing sequence can include the CPU 320 executing a load or store to a virtual address. This starts normal first tier TLB handling to occur in the first MMU 340, where physical addresses are then determined. Assuming there is no page fault initially, data (or instruction) caches in the CPU 320 are consulted. In response to a miss in the cache, a read or other type request (e.g., write) is generated to satisfy the cache miss. This is issued by the CPU 320 to a memory location that is external the bus. If the supervisory MMU 310 looks up the physical address and it results in a fault (e.g., no permission to request data from a corresponding address), the supervisory MMU 310 provides the external fault response to the CPU 320 and fault handler 370. After receiving notice of the external fault, the CPU 320 retires the read or other operation request from its protocol layer trackers, freeing them up for other uses. The CPU then signals the thread(s) that is/are blocked on the particular cache miss to process an external MMU fault, for example (e.g., if supervisory MMU is the fault response generator). Upon completion of the supervisory MMU fault (s) handler execution (See e.g., FIG. 4), the caches in the CPU 320 re-issue the miss request (e.g., read or write) to the external protocol layer, and then the external read or invalidate succeeds, for example.

Figure 4:
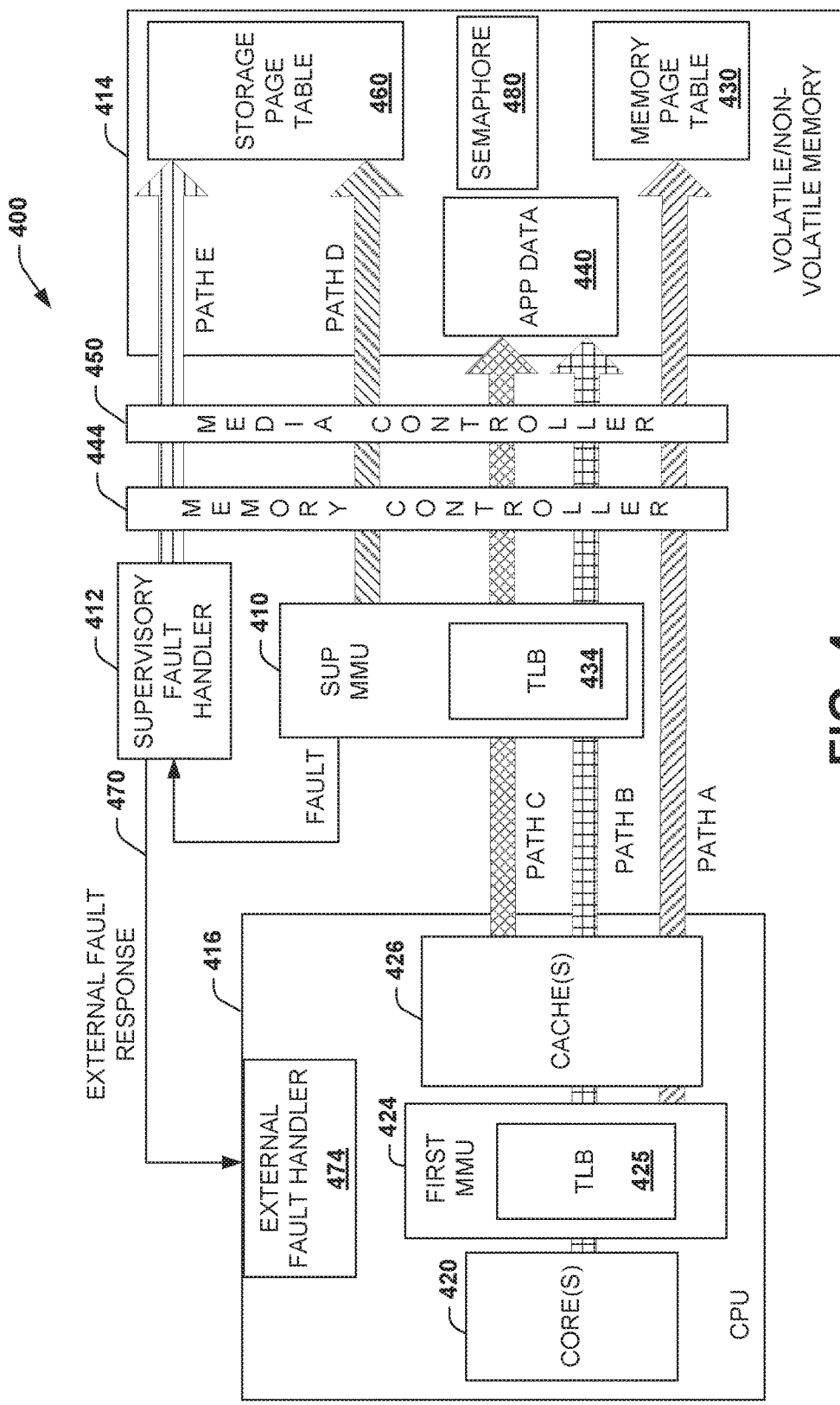
FIG. 4 illustrates an example of a system that employs a supervisory memory management unit and fault handler to control access to a common memory storage area.

MMU operation can also include page table accesses to the memory 330 in the event that the supervisory MMU 310 cannot locate a given storage address in its internal buffer (see, e.g., FIG. 4). In addition to second-tier address translation, permissions control, and fault handling, the supervisory MMU 310 can perform tasks such as page table processing, page fault handling, paging operations, memory swapping, copying on memory writes, allocating on reads, among many other functions as disclosed herein.

Although the multi-tiered system 300 can be employed to manage non-volatile memories 330, volatile memory management can also be performed by the system 300. For example, the supervisory MMU 310 can allocate trusted areas of volatile memory such that only those CPUs having the requisite permission can access the volatile memory. Such volatile management examples can be utilized for a communications architecture between multiple servers/clients, for example, where trusted memory areas are reserved for in-server use and common storage areas are utilized for communications between servers. For example, the supervisory MMU 310 controls access to the common and the trusted areas of volatile memory based on the permissions of a given request.

The following describes some differences between existing single-tiered MMU systems and the example multi-tiered system 300 depicted in FIG. 3. Some existing CPU architectures implement a single tier of memory management implemented in a first tier memory management unit (MMU), used to manage a corresponding single tier of volatile main memory (e.g. DRAM). The single tier MMU architecture uses a translation cache often referred to as a translation lookaside buffer (TLB), backed by storage referred to a page table (PT), a hardware or software device for populating the TLB on demand from the PT, referred to as a page walker (PW), as well as logic to check access permissions, test fault conditions, and if necessary generate a synchronous page fault (PF). Such PF results in the execution by the CPU of a handler routine referred to as a page fault handler (PFH).

A responsible layer of privileged software in single tier systems, typically an operating system, driver, hypervisor, or some combination thereof, manages the content of the page tables on behalf or multiple processes, each of which has a virtual memory (VM) map, that is to be translated into a portion of a common shared physical address (PA) map. This privileged software also manages, with the assistance of the single tier MMU, features such as the PF mechanism, the creation, deletion, and transition between storage tiers of regions (called pages) of virtual memory space. These features can take many forms and have many names, such as paging in, paging out, swapping, copying on write, allocating on read, and so forth.

As disclosed herein, memory management should be trusted to privileged OS software running in-band on the server, whereas storage management of a pool of storage (e.g., common memory 330) that is shared by multiple servers should be handled by a more trusted separate storage management entity, such as the supervisory MMU 310 disclosed herein, rather than any one of the servers.

FIG. 4 illustrates an example of a system 400 that employs a supervisory MMU 410 and supervisory fault handler 412 to control access to a common memory storage area shown as memory 414. Similar to FIG. 3 above, the memory 414 can include volatile and/or non-volatile storage. The system 400 includes a CPU 416 having one or more cores 420 to perform processing in accordance with internal operations of the CPU and the memory 414. A first MMU 424 performs a first tier address translation of virtual memory to physical memory for the cores 420. The first MMU 424 includes a first TLB 425 to facilitate the first tier address translation. The CPU 416 can also include one or more caches 426 to store data or instructions on chip. If a read or write request is made to the cache 426 that cannot be located within the cache, an external read or write request can be issued to the supervisory MMU 410 to store or retrieve data from the memory 414.

As shown, the CPU 416 can support various data paths in the system 400. A path A can be employed that can bypass the supervisory MMU 410 to access a memory page table 430 if a TLB cache miss is encountered with cache 426. The path A can support page walk reads to the memory page table 430. A path B originates at the core 420 and proceeds through the TLB 425 and cache 426. The path B proceeds through a second TLB 434 in the supervisory MMU 410 to access application data 440 (also referred to as APP data). The Path B supports in-band reads, for example, that occur via processing by the core 420 and first MMU 424.

During path B operations, the supervisory MMU 410 performs a physical address to storage address translation via the TLB 434 to access the application data 440. A third path C can also be supported by the CPU 416. The path C originates from the cache 426 and proceeds through the supervisory MMU 410 and TLB 434 to the application data 440. Path C supports writes that are issued from the cache 426 that can result from cache pressure eviction, for example (e.g., available cache space for read is not available in cache and thus transferred to external memory).

One or more components can support path operations between the CPU 416, supervisory MMU 410, and memory 414. Such components can be provided as part of a memory bus architecture, for example. These can include a memory controller 444 and/or a media controller 450, for example. In some examples, the functions of the memory controller 444 and media controller 450 can be combined into a single integrated circuit. The media controller 450 controls aspects of the memory interface that are specific to the type of medium attached (e.g. various non-volatile memory types, DRAM, flash, and so forth). These may include, for example, media-specific decoding or interleave (e.g., Row/Column/Bank/Rank), media-specific wear management (e.g., Wear Leveling), media-specific error management (e.g., ECC correction, CRC detection, Wear-out relocation, device deletion), and/or media-specific optimization (e.g. conflict scheduling). The memory controller 444 controls aspects of the memory interface that are independent of media, but specific to the CPU or system features employed. This may include, for example, system address decoding (e.g., interleaving between multiple media controllers, if there are more than one), and redundancy features, for example (e.g., RAID, mirroring, and so forth).

Other example paths supported in the system 400 include a path D which runs from the supervisory MMU 410 to a storage page table 460. The storage page table is utilized when cache misses occur in the supervisory MMU 410. The path D can be employed, for example, for page walk reads when second tier cache misses occur in the supervisory MMU 410's TLB 434, for example. A path E can originate from the external fault handler 412 which responds to a fault output (FAULT) from the supervisory MMU 410. As shown, path E can also access the storage page table 460. The fault handler 412 can also provide an external fault response 470 to the CPU 416 to notify it that a second-tier fault has been issued by the supervisory MMU 410.

The respective first-tier MMUs, such as MMU 424, typically consult their respective page tables to determine permissions, address mappings and other attributes on behalf of a read or write to a virtual address. When the MMU 424 looks up a virtual address, the memory page table 430 informs the MMU 424 not only what physical address the virtual address is mapped to, but also what permissions and other attributes apply to that mapping. The memory page table 430 may be structured such that different processes under the operating system or different operating systems under the hypervisor have distinct mappings, attributes, and permissions. If permissions enumerated in the table prohibit the read or write from completing, a page fault may be generated, and a software page fault handler (PFH) executed by the CPU 416 may or may not be able to correct the permissions stored in the memory page table 430 and thus re-issue the read or write with a successful outcome. If the MMU 424 cannot correct the permissions (e.g., since what was being requested is illegal) then fault handler software on the CPU 416 may take whatever action is appropriate. Often the appropriate action is for the fault handler to terminate the process that has made the illegal request. However, first-tier MMUs 424 govern only permissions for access to physical address ranges. This is adequate for an operating system or hypervisor controlling access to physically-mapped resources by non-privileged processes under its supervision.

The supervisory MMU 410 and its supervisory fault handler 412 supervise the access permissions to storage addresses, on behalf of a read or write to a physical address that has already been translated from virtual by the first-tier MMU 424. The supervisory MMU 410 consults its storage page table 260 to determine permissions, address mappings and other attributes. The supervisory/storage page table 460 may be structured such that different CPUs, servers, and/or clients have distinct mappings, attributes, and permissions. When the supervisory MMU 410 looks up a physical address, the storage page table 460 informs the MMU 410 not only what storage address the physical address is mapped to, but also what permissions and other attributes apply to that mapping. If permissions enumerated in the storage page table 460 prohibit the read or write request from completing, corrective action may be needed, analogous to a page fault, but implemented in a trusted supervisory fault handler 412 rather than in the CPU that issued the read or write.

An external fault handler 474 can be provided to process the external fault response 470 from the supervisory fault handler 412. An example fault processing sequence can include the CPU 416 executing a load or store to a virtual address. This starts normal first tier translation lookaside buffer (TLB) 425 handling to occur in the first MMU 424, where physical addresses are then determined. Assuming there is no page fault initially, data (or instruction) caches in the CPU 420 are consulted. Assuming a miss in the cache 426, an external read or other type request (e.g., write) is generated to satisfy the cache miss. This is issued by the CPU 420 to external the bus. If the supervisory MMU 412 looks up the physical address and it results in a fault (e.g., address requested does not have permission), the supervisory MMU 310 provides the external fault response to the CPU 416 and fault handler 474. After receiving notice of the external fault, the CPU 416 retires the read or other operation request from its protocol layer trackers, freeing them up for other uses. It then signals the thread(s) that is/are blocked on the particular cache miss to process an external MMU fault, for example (e.g., if supervisory MMU is the fault response generator). Upon completion of the supervisory MMU fault(s) handler execution, the caches 426 in the CPU 416 re-issue the miss request (e.g., read or write) to the external protocol layer, and then the external read or invalidate succeeds, for example.

When the supervisory fault handler 212 has completed its actions, possibly including updating the storage page table 460 to alter permissions, the MMU 410 may re-attempt the physical-to-storage address translation. The read or write request may then be able to complete with corrected permissions (e.g., as corrected by the supervisory fault handler 212). If the supervisory fault handler 412 cannot correct the permissions (e.g., since what was being requested is illegal) then the supervisory MMU 410 may assert the external fault response 470 via fault handler 412. Unlike first-tier MMUs 424, the supervisory MMU 410 governs permissions for access to storage address ranges. Since the supervisory MMU 410 and supervisory fault handler 412 may operate outside of and independent of any of the CPUs 416, they can provide a more trusted tier of management on behalf of storage than the tier implemented in the CPUs' MMUs 424. Thus, storage may be managed on behalf of many un-trusted CPUs, servers and clients by a trusted entity such as the supervisory MMU 410.

In one example, the supervisory MMU 410 can be implemented outside of the CPU 416 in external logic, although it can also be integrated into the CPU, in other examples. The supervisory MMU 410 can be downstream of the first tier MMU 424, between any of the CPU cache tiers, or downstream of the final cache tier in other examples. The supervisory MMU 410 can have similar functionality to the first MMU 424, including the TLB, page table (PT), page fault (PF) capability, address translation, and so forth. In one example, the TLB 434 consultation occurs for every last-level cache miss. Thus, it can be associated with coherent-region memory reads, for example. It can also be associated with cache evictions (writes), as noted previously. The external fault response 470 returned to the CPU 416 in response to an outstanding memory access request should be communicated back to the CPU in a synchronous manner, just as a successful completion response would be communicated in the absence of an external page fault. Synchronous communication is utilized in order to enable the external fault handler 474 to associate the response with the particular outstanding memory access that caused the fault. Thus, the external fault response should be an integral part of the CPU's external bus protocol, just as other types of responses are, such as successful completion or error responses.

The page fault capability of the supervisory MMU 410 can cause the CPU 416 to execute the external page fault handler 474 similar to one that may occur in a "standard" page fault from a traditional first-tier MMU 425. However, current state of the art CPUs provide no mechanism to enter a synchronous fault handler 474 in response to any condition detected any time after successful first-tier MMU address translation.

In addition to the capability to cause a page fault handler 474 to run on the CPU 416 that incurred the fault, a capability is also provided to cause the fault handler 412 to run on some other CPU (or state machine), such as a more privileged storage management processor which in this example is shown as the supervisory fault handler 412. This capability allows fault-triggered behaviors that can manipulate storage-tier Page Tables (PTs), without giving direct access permissions to these tables to the less trusted CPU that took the fault. One example mechanism to signal the faulted CPU can be provided via a polled semaphore 480 of the completion of the PFH code on the storage management CPU 412, so that the faulted CPU 416 can end its own PFH and resume normal operations.

As noted previously, the system 400 supports storage-related address translation in load/store-accessed non-volatile memory (e.g., to support volume virtualization, partitioning, RAID, copy-on-write, migration, and so forth). The system 400 provides separation of responsibilities between memory and storage management, by segregating their functions into different MMUs with distinct page tables under the control of distinct software and/or hardware entities—thereby allowing storage to be suitably shared between different servers with each server only being trusted with its own data.

Figure 5:
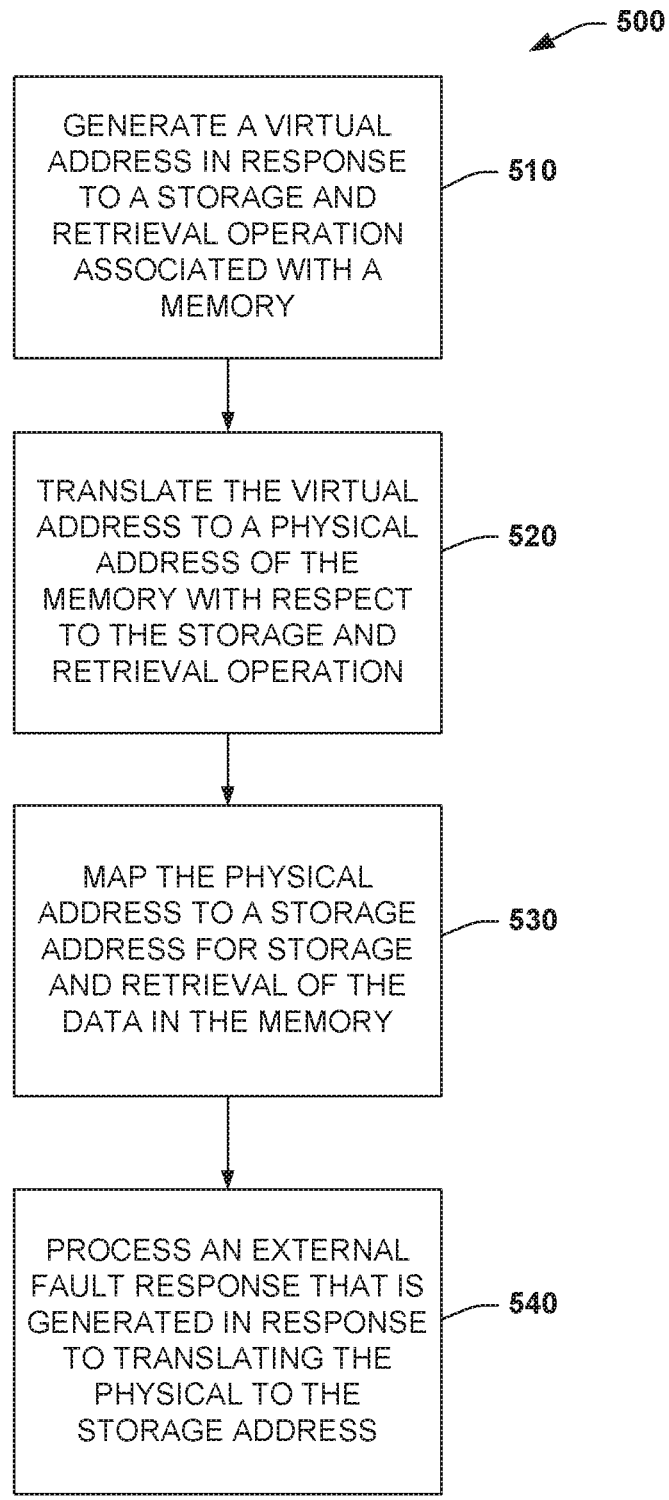
FIG. 5 illustrates an example of a method to control access to a common memory storage area utilized by multiple processing units.

In view of the foregoing structural and functional features described above, an example method will be better appreciated with reference to FIG. 5. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components and executed by an integrated circuit, computer, or a controller, for example.

FIG. 5 illustrates an example of a method 500 to control access to a common memory storage area utilized by multiple processing units. At 510, method 500 includes generating a virtual address in response to a storage and retrieval operation associated with a memory (e.g., via CPU 120 and MMU 140 of FIG. 1). At 520, the method 500 includes translating the virtual address to a physical address of the memory with respect to the storage and retrieval operation (e.g., via CPU 120 and MMU 140 of FIG. 1). At 530, the method 500 includes translating the physical address to a storage address for storage and retrieval of the data in the memory (e.g., via supervisory MMU 110 of FIG. 1). At 540, the method 500 includes processing an external fault response that is generated in response to translating the physical to the storage address and relates to a fault being detected external to the processor with respect to the storage address (e.g., via external fault handler 130 of FIG. 1). Although not shown, the method 500 can also include employing permissions stored in the storage page table to control access to the memory (e.g., processor A has permissions enumerated for storage address blocks 2 and 3, processor B has permissions enumerated for stage address blocks 3, 4, and 5).

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system, comprising:
a central processing unit (CPU) to process data;
a first memory management unit (MMU) in the CPU to generate an external request to a bus for data located external to the CPU; and
an external fault handler in the CPU to process a fault response received via the bus, wherein the fault response is generated externally to the CPU and relates to a fault being detected with respect to the external request;
wherein the CPU retires an operation from a protocol layer that caused the fault and signals a thread that is blocked on a given cache miss to execute an external fault corresponding to the fault response, and
the CPU comprises a cache that re-issues a cache miss request to the protocol layer in response to execution of the external fault to enable the external request to be completed after the fault is detected.

2. The system of claim 1, further comprising a fault generator to generate the fault response, the fault generator includes at least one of a watchdog timer, a supervisory memory management unit or a supervisory fault handler to generate the fault response.

3. The system of claim 1, wherein the external request is generated in response to a virtual to physical address translation of the first MMU.

4. The system of claim 3, further comprising a supervisory MMU to translate the physical address of the first MMU to a storage address for storage and retrieval of the data in memory, wherein the supervisory MMU controls access to the memory via the storage address.

5. The system of claim 1, wherein the supervisory MMU employs permissions stored in a storage page table to control access of multiple CPUs that request to load or store data to a storage address.

6. The system of claim 5, further comprising a supervisory fault handler that performs storage page table accesses to the memory in response to a supervisory page fault generated by the supervisory MMU.

7. A system, comprising:
a central processing unit (CPU) to process data with respect to a virtual address generated by the CPU;
a first memory management unit (MMU) to translate the virtual address to a physical address of a memory with respect to the data processed by the CPU;
a supervisory MMU to translate the physical address of the first MMU to a storage address for storage and retrieval of the data in the memory;
an external fault handler in the CPU to process a fault response received by the CPU, wherein the fault response is initiated by the supervisory MMU and relates to a fault being detected with respect to the storage address; and a cache in the CPU that re-issues a cache miss request to the protocol layer in response to execution of the external fault handler that enables the external request to be completed after the fault being detected;

wherein the CPU retires an operation from a protocol layer that caused the fault and signals a thread that is blocked on a given cache miss to execute an external fault.

8. The system of claim 7, wherein the supervisory MMU employs permissions stored in a storage page table to control access of multiple CPUs that request to load or store data to the storage address.

9. The system of claim 8, further comprising a supervisory fault handler that performs storage page table accesses to the memory in response to a supervisory page fault generated by the supervisory MMU.

10. A method, comprising:

generating, by a processor, a virtual address in response to a storage or retrieval operation associated with a memory;

translating, by the processor, the virtual address to a physical address of the memory with respect to the storage or retrieval operation;

translating the physical address to a storage address for storage and retrieval of the data in the memory; and processing an external fault response that is generated in response to translating the physical address to the storage address and relates to a fault being detected external to the processor with respect to the storage address;

retering an operation from a protocol layer that caused the fault signalling a thread that is blocked on a given cache miss to execute an external fault; and re-issuing a cache miss request to the protocol layer in response to execution of the external fault handler that enables the external request to be completed after the fault being detected.

11. The method of claim 10, further comprising employing permissions stored in a storage page table to control access to the memory according to permission assignments in the storage page table.

* * * * *